March 17, 1953     B. J. SATRE     2,631,882
BALE HANDLING HOOK
Filed June 16, 1950
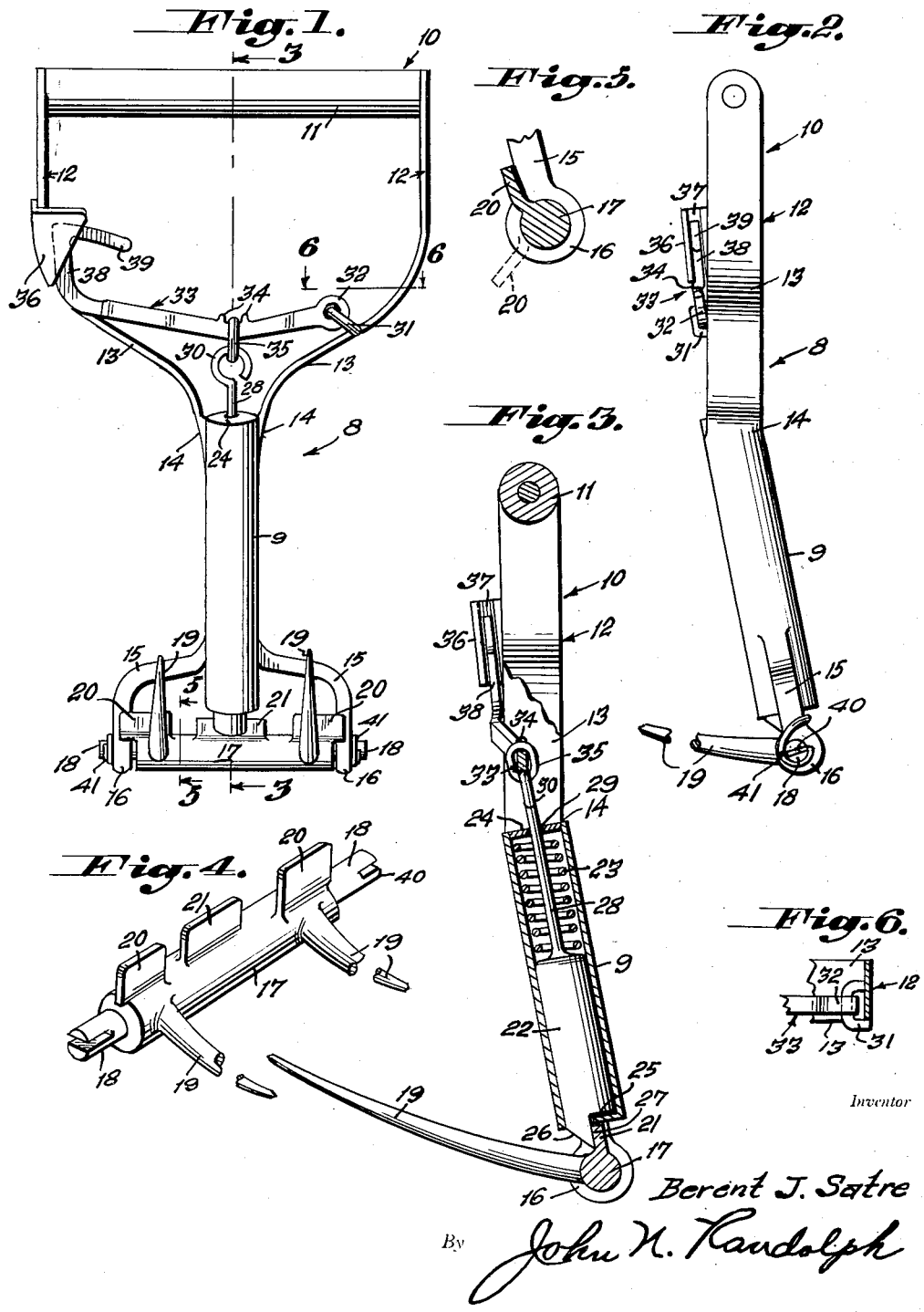
Inventor
Berent J. Satre
By John H. Randolph
Attorney Patented Mar. 17, 1953

2,631,882

UNITED STATES PATENT OFFICE 2,631,882

BALE HANDLING HOOK

Berent J. Satre, Big Timber, Mont.

Application June 16, 1950, Serial No. 168,485

3 Claims. (Cl. 294—26)

1

This invention relates to a novel construction of hook for handling baled material such as baled hay and has for its primary object to provide a bale handling hook provided with a manually actuated tine releasing means whereby the bale engaging tines may be released to swing relatively to the supporting frame of the hook so that the tines may assume a position to disengage themselves from a bale to allow the bale to drop from the tines without requiring that the bale be rested on a supporting surface before the hook can be disengaged therefrom. Accordingly, it is possible to unload bales from a higher to a lower surface, as from a truck onto the ground or from a stack onto a truck without actually placing the bale on the lower surface and thereafter disengaging the hook therefrom, since the bale may be dropped by disengaging the tines to allow them to swing downwardly to a bale releasing position.

Still a further object of the invention is to provide a bale handling hook having a trigger for releasing the tines whereby said tines may be swung to a bale releasing position by the weight of a bale supported thereon and which trigger is disposed adjacent the handle of the hook to enable it to be operated with a finger of the hand engaging the handle so that one of the hooks may be utilized with the right hand and another hook with the left hand for simultaneously handling two bales.

Still a further object of the invention is to provide a bale handling hook having means for returning the tines to an operative position and for latching the tines in an operative position after a bale has been released therefrom and which is accomplished automatically so that the hook is almost instantly available for re-use after a bale is disengaged therefrom.

Various other objects and advantages of the invention will hereinafter become more fully apparent from the following description of the drawing, illustrating a presently preferred embodiment thereof, and wherein:

Figure 1 is a front elevational view of the bale handling hook;

Figure 2 is a side or edge elevational view thereof looking from right to left of Figure 1;

Figure 3 is a longitudinal substantially central sectional view taken substantially along a plane as indicated by the line 3—3 of Figure 1;

Figure 4 is a fragmentary perspective view of a portion of the hook;

Figure 5 is an enlarged fragmentary cross sectional view taken substantially along a plane as indicated by the line 5—5 of Figure 1, and

2

Figure 6 is a transverse sectional view taken substantially along a plane as indicated by the line 6—6 of Figure 1.

Referring more specifically to the drawing, the bale handling hook in its entirety is designated generally 8 and includes a barrel 9 to one end of which is connected a handle, designated generally 10. The handle 10 includes a grip portion 11 and a pair of corresponding supporting bars 12, corresponding ends of which are suitably secured to the ends of the grip 11. The handle portions or bars 12 have inwardly curved corresponding intermediate portions 13 and opposite inwardly offset ends 14 which are suitably secured to opposite sides of one end of the barrel 9. As best seen in Figures 2 and 3, the barrel 9 is disposed at a slight angle to the plane of the handle 10.

A pair of corresponding journal arms 15 are secured to the barrel 9, adjacent its opposite end, and extend outwardly in opposite directions therefrom and in the same direction as the handle portions 12 extend from the barrel 9, said journal arms 15 having corresponding downturned free ends which terminate in aligned bearing portions 16. A relatively large shaft 17 has restricted terminals 18 which are journalled in the journal portions 16. The shaft 17, adjacent to but spaced from each of the terminals 18 is provided with two bale engaging tines or prongs 19 which extend outwardly therefrom and which are curved slightly from end-to-end thereof and are tapered toward their free ends. The tines 19 are disposed in the same plane. A flange 20 projects radially from the shaft 17, adjacent each of its terminals 18, said flanges 20 being disposed at an angle to the tines 19 and having outer end portions which overlie the ends of the enlarged portion of the shaft 17, for a purpose which will hereinafter become apparent. A flange 21 projects radially from the intermediate portion of the shaft 17 and extends longitudinally thereof and constitutes a part of a latch means, hereinafter to be described.

A latch bolt 22 is reciprocally mounted in the barrel 9 and is urged downwardly with respect thereto by an expansion coiled spring 23 which is disposed in the barrel 9 between the upper end of the latch bolt 22 and the upper end wall 24 of the barrel 9. The latch bolt 22 is provided with a recessed lower end forming a shoulder 25 which is disposed longitudinally of the latch bolt and which extends substantially diametrically thereof and said restricted lower end of the latch bolt is provided with a bevelled surface 26 on the side thereof opposite the shoulder 25 forming a cam portion, as will hereinafter be more fully described. The lower end of the bolt 26 is open except for an inturned flange 27 against which a portion of the recessed lower end of the bolt 22 normally seats for limiting the downward sliding movement of the bolt 22 under the biasing action of the spring 23 and to prevent rotation of the bolt in barrel 9. A rod 28 is fixed to and projects from the upper end of the bolt 22 through the spring 23, loosely through an opening 29 in the end wall 24 and is provided with a split eye or hook 30 at its upper end and which is disposed above the end wall 24. The end wall 24 is suitably secured in the barrel 9 after the plunger 22 and spring 23 are applied thereto and the eye or hook 30 is thereafter formed in the upper end of the rod 28.

A small bail 31 is suitably secured to the portion 13 of one of the handle portions 12 and extends inwardly therefrom to loosely engage an eye 32 formed on one end of a lever 33 which extends transversely across the handle 10, above and adjacent the barrel 9. The upper edge of the lever 33 is provided with two longitudinally spaced upstanding lugs 34 which are disposed directly above the barrel 9. A ring or link 35 loosely engages the lever 33, between said lugs 34 and is connected to the eye or hook 30 for forming a connection between the lever 33 and latch bolt 22. As previously stated, the handle 10 is disposed at a slight angle to the barrel 9 and the lever 33 is loosely pivoted by the bail 31 so that it may extend across the handle 10 and be disposed at an angle thereto, as illustrated in Figures 2 and 3, so that its intermediate portion will be disposed in a plane substantially parallel to the longitudinal axis of the barrel 9.

The other handle member 12 has a guide 36 suitably secured to one side edge thereof and which is disposed at a slight angle to the plane of the handle 10. Said guide 36 is provided with an inwardly opening guide groove or channel 37. The other, free end of the lever 33 is inwardly offset slightly toward the plane of the handle 10 and includes an upturned portion 38 which terminates at its upper end in a turned back terminal portion 39 which extends back toward the pivoted end of the lever and which forms a finger hold or trigger portion. The lever portion 38 is slidably disposed in the channel 37 so that the swinging movement of said lever is guided by the guide 36.

At least one and preferably both shaft terminals 18 are provided with longitudinally extending slots 40 which preferably open outwardly of the outer ends of the terminals 18 and each of which receives and anchors an end of a spring 41 which is wound around the terminal 18, outwardly of the journal 16 of said terminal, and which is anchored at its other end to the journal 16 so that the springs 41 will urge the shaft 17 to revolve in a clockwise direction as seen in Figures 2 and 3 to cause the tines 19 to swing upwardly and toward their full line positions of Figures 2 and 3.

The bale handling hook 8 as illustrated in the drawing is intended for use with the right hand and is grasped by the right hand engaging the handle grip 11 so that the prongs 19 will extend inwardly from the inner side or palm of the hand, not shown. The trigger portion 39 is disposed so that it may be readily engaged with the index finger of the hand which grips the handle grip 11. The bale handling hook may also be constructed for use with the left hand by simply reversing the lever 33 in the guide 36 so that the lever 33 will be pivoted to the corresponding portion of the other handle portion 12 and the guide 36 will likewise be oppositely disposed relatively to its position as illustrated. It will be noted that the tines 19 when in their latched positions of Figure 3 are curved upwardly from the shaft 17 toward their free ends and relatively to the plane of the handle 10. Accordingly, with the tines 19 latched in an operative position as illustrated in the drawing, said tines may be engaged in a bale which may then be lifted by the hook 8. Assuming that the hook is being utilized, for example, for loading or unloading bales from a higher to a lower surface and after a bale has been engaged, lifted and moved by the hook 8 and before it has come to rest on a lower surface such as a truck bed on which it is to be loaded or on the ground or other surface from a truck, from which the bale is being unloaded, the hand grasping the grip 11 may be utilized for disengaging the hook from the bale by exerting an upward pull on the trigger portion 39 with the index finger thereby causing the lever 33 to swing clockwise on its pivot 31 to exert a pull on the latch bolt 22 through the rod 28. This will displace the bolt 22 upwardly to disengage the shoulder 25 from the latch element 21 so that the weight of the bale, not shown, will cause the tines 19 to swing downwardly against the action of the springs 41 toward their dotted line positions of Figure 5. As the tines 19 approach their dotted line positions of Figure 5 the bale will slide therefrom and as soon as the tines are disengaged from the bale the springs 41 cause them to swing upwardly in the opposite direction and back to their full line positions of Figures 2 and 3. The tines 19 are prevented from swinging upwardly beyond their full line positions by the stop members 20 engaging the journal arms 15, as best seen in Figure 5, so that said portions cooperate with the springs 41 to position the latch element 21 to be re-engaged behind the shoulder 25 for thereby automatically re-latching the tines 19 in an operative position and almost instantly after a bale is released therefrom. This may be accomplished by retaining pressure on the trigger 39 until the tines 19 have resumed their positions of Figure 3 after which the trigger 39 can be released to allow the bolt 22 to be again projected downwardly by the spring 23; however, if the trigger 39 is previously released and the bolt projected downwardly, the latch element 21 will strike the bevelled surface 26 which will function as a cam to cam the latch bolt 22 upwardly so that the latch element 21 can pass under the lower end of the shoulder 25, after which the spring 23 will project the latch bolt 22 and position the shoulder 25 in front of the latch element 21. It will thus be seen that a bale handling hook has been provided which may be readily operated with one hand, so that an operator may use a similar hook with each of his hands for simultaneously handling two bales and it will also be apparent that the hooks can be disengaged from the bales before actually resting the bales on a supporting surface, as is necessary with conventional bale hooks.

Various modifications and changes are contemplated and may obviously be resorted to, without departing from the spirit or scope of the invention as hereinafter defined by the appended claims:

I claim as my invention:

1. A manually supported bale handling hook comprising an elongated frame having a bail-type handle defining one end thereof and a pair of laterally spaced journal arms constituting the opposite end of the frame structure, a barrel, forming a part of the frame structure, having a portion extending between said handle and journal arms and at an angle to the plane of the handle, a shaft journaled in the journal arms transversely of the frame structure and beyond an end of the barrel, a plurality of tines projecting from said shaft transversely thereof, a spring projected latch bolt reciprocally mounted in the barrel and spring urged toward said shaft, a latch element carried by said shaft and engaged behind a portion of the latch bolt, when the latter is in a projected position, for maintaining said tines in an operative position at an acute angle to the plane of the handle, and latch release means swingably connected to the handle and disposed in the opening thereof and connected to the latch bolt for retracting the latch bolt out of engagement with said latch element when the latch release means is swung away from the barrel whereby said tines and shaft will be released to swing downwardly by the weight of a load engaged by the tines to a depending substantially vertical load releasing position.

2. A bale handling hook as in claim 1, and spring means connected to the shaft and frame structure for returning the tines to an operative position after a load is released therefrom and for returning the latch element to a position to be engaged by the latch bolt.

3. A manually supported bale handling hook as in claim 1 said barrel and journal arms being disposed in a plane at an angle to the plane of the handle, and said tines being disposed at an acute angle to the plane of the handle and to the axis of the barrel when in an operative position and at a greater angle to the plane of the handle than to the axis of the barrel.

BERENT J. SATRE.

REFERENCES CITED

The following references are of record in the file of this patent:

UNITED STATES PATENTS

| Number | Name | Date |
|---|---|---|
| 842,420 | Petty | Jan. 29, 1907 |
| 1,004,297 | Nygren | Sept. 26, 1911 |
| 1,061,175 | Guy et al. | May 6, 1913 |
| 1,116,688 | Gaskill | Nov. 10, 1914 |
| 1,408,342 | Collins | Feb. 28, 1922 |
| 1,465,510 | Cote | Aug. 21, 1923 |
| 1,710,575 | Grant | Apr. 23, 1929 |
| 2,138,694 | Daugherty | Nov. 29, 1938 |

FOREIGN PATENTS

| Number | Country | Date |
|---|---|---|
| 410,395 | Germany | Mar. 6, 1925 |
| 116,115 | Great Britain | June 6, 1918 |